Patented June 7, 1932

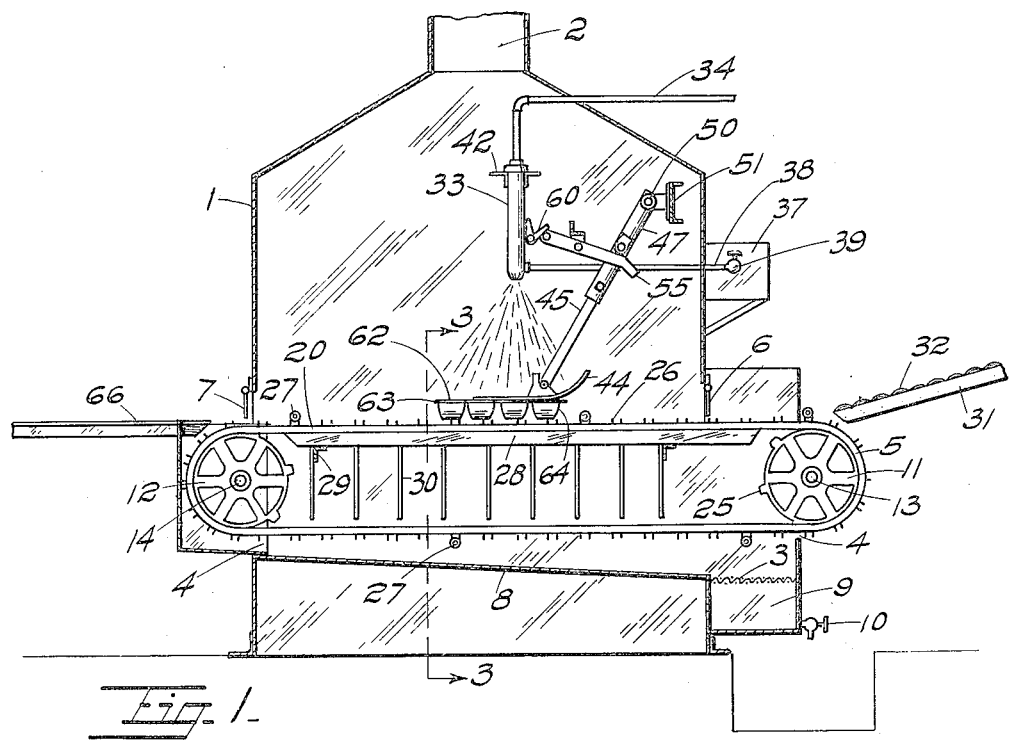
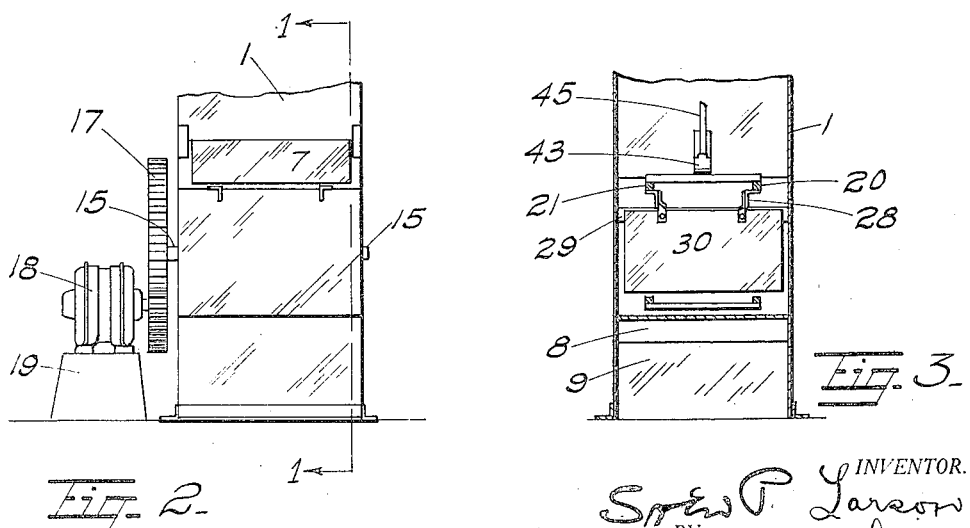

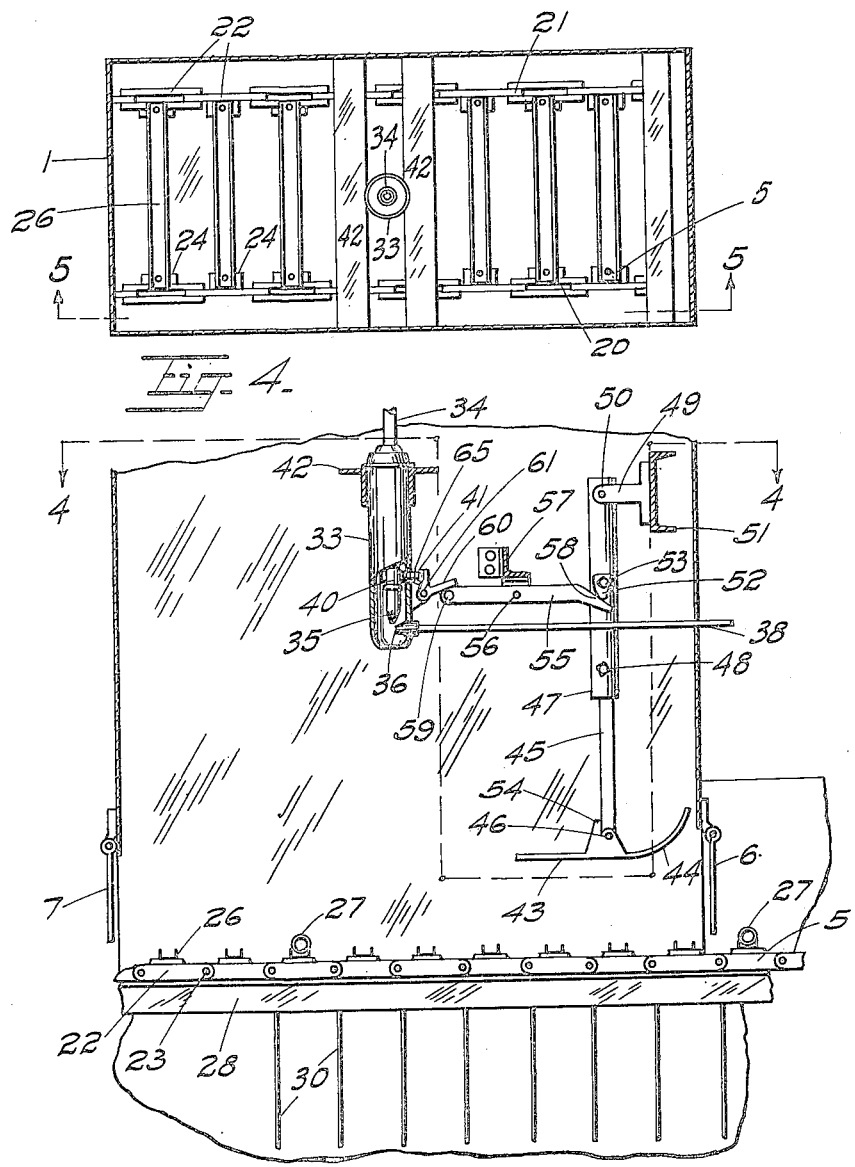

1,862,380

UNITED STATES PATENT OFFICE

SVEN P. LARSON, OF BERKELEY, CALIFORNIA, ASSIGNOR TO LARSON MACHINE COMPANY, LTD., A CORPORATION OF CALIFORNIA

AUTOMATIC PAN SPRAYING MACHINE

Application filed December 9, 1929. Serial No. 412,704.

The invention is for an automatic pan spraying machine, and has special reference to bakeries or bread producers.

The object of the invention is to provide a machine for automatically spraying freshly baked bread and similar products with an edible oil or fat for the purpose of softening the crust of such products.

Another object of the invention is to provide a sanitary, economical and inexpensive method, replacing the existent hand methods of swabbing and brushing the loaves with an edible oil.

A still further object of the invention is to provide means for automatically supplying the required edible oil to the crust of bread loaves, recovering the unused portion of said oil, and keeping the pans containing the loaves clean and practically free from oil.

A preferred embodiment of my invention is illustrated in the accompanying drawings, in which:

Fig. 1 is a longitudinal sectional elevation through the invention, taken on line 1—1 Fig. 2;

Fig. 2 is a fragmentary end elevation indicating a method of driving the conveyor;

Fig. 3 is a fragmentary sectional elevation taken on line 3—3, Fig. 1;

Fig. 4 is a sectional plan view taken on line 4—4 Fig. 5;

Fig. 5 is a fragmentary sectional elevation, taken on line 5—5, Fig. 4.

Referring to the accompanying drawings in which similar reference characters are used to indicate similar parts throughout the several views, reference numeral 1 indicates a spray chamber provided with an exhaust stack 2. Openings 4 are provided for the installation of conveyor 5. Drop curtains or doors 6 and 7 are provided for normally keeping the section of opening 4, above conveyor 5, closed. Directly beneath conveyor 5 a drain floor 8 is provided to catch excess oil or fat, and cause same to drain into the sump 9 which is provided with a valve 10 for the purpose of draining the contents of said sump. A filter medium 3 is provided over sump 9 for the purpose of filtering or cleansing the oil received from floor 8, thereby causing the oil or fat, when drained from sump 9 through valve 10 to be clean and satisfactory for reuse.

The conveyor 5 comprises two pair of sprockets 11 and 12, mounted on shafts 13 and 14, said shafts being supported by bearings 15 mounted on spray chamber 1. Sprockets 12 are keyed to or otherwise retained in relative position on shaft 14. Sprockets 11 are longitudinally retained on shaft 13 in relative position with sprockets 12. A suitable drive is provided, as indicated at 16, which illustrates a spur gear reduction 17 and an electric motor 18, said motor being suitably mounted in relative position, as indicated at 19. Any other known method may be used for driving the conveyor, for instance, belt and pulleys, or other system, depending on conditions surrounding the installation.

The conveyor belt comprises two continuous strands of chain 20 and 21 composed of links 22, pivotally connected as at 23, and provided with integral brackets 24, said links being adapted to cooperate with teeth 25 on sprockets 11 and 12, said chains 20 and 21 forming continuous strands over and from one sprocket to the other. Sprockets 12 on shaft 14 are so disposed as to cause brackets 24 on links 22 to conform oppositely and at right angles to the two strands of chain. Carrier members 26 are attached at their opposite ends to oppositely disposed brackets 24 on chains 20 and 21, and are indicated as constructed of small structural section, such as channels. Attached at intervals about said conveyor belt to said carrier members, pushers 27 are provided, and may be formed of lengths of pipe as indicated and approximately equal in length to the carrier members 26. Tracks 28 provide supports for chains 20 and 21 and consist of structural angles, providing means for maintaining said chains in a horizontal plane. Transverse supports 29 are fixed to the side walls of spray chamber 1 and provide supports for track 28. Suspended from tracks 28 a multiplicity of baffle plates 30 are provided, forming below the top strand of conveyor belts 20 and 21 a condensing chamber. An approach is provided, consisting of a support 31, to the upper surface of which a gathered fabric 32 is detachably fixed.

The automatic spray system comprises a spray gun 33, which may be of a type of standard paint spray gun, or may be constructed as indicated in Fig. 5. A supply of compressed air is provided through a pipe line 34 to an impinging nozzle 35 provided with a restricted aperture, through which the air is forced adjacent to the tip of nozzle 36, which is also provided with a restricted aperture. Nozzle 36 is connected to a supply tank 37 by means of pipe line 38, said pipe line being provided with a control valve 39 for controlling the feed of oil through nozzle 36. A standard push type valve 40 is provided for opening and closing the air supply through nozzle 35 and operated by plunger 41. Spray gun 33 may be mounted in any convenient manner, or, as indicated, by means of transverse supports 42.

The valve operating mechanism comprises a shoe 43, provided with an arcuate approach section 44, said shoe being pivotally connected to member 45, as indicated at 46, and provided with a stop 54, said member 45 being slidably and adjustably mounted in the cylindrical member 47 and retained by a set screw 48. Cylindrical member 47 is pivotally supported by brackets 49, as indicated at 50, brackets 49 being supported by transverse member 51 which is fixed to the side walls of spray chamber 1.

A cam 52 is adjustably mounted on cylindrical member 47 by means of cap screw 53. Operating lever 55 is pivotally supported at 56 by means of transverse member 57, which in turn is supported by the side walls of spray chamber 1. Lever 55 is provided with the co-operating surface 58 for engagement with cam 52. A pin 59 integral with lever 55 co-operates with valve operating bell crank trigger 60, which is pivotally mounted on spray gun housing 33, as indicated at 61.

The operation of the invention is as follows: Conveyor 5 is driven by means of sprockets 11 and 12 turning in a contra-clockwise direction as viewed in Fig. 1. A pan 62 containing loaves of bread or similar products is advanced to the conveyor, over and in contact with gathered fabric 32, thus cleaning the under surface of the pan. As the pan is deposited on conveyor 5, it is immediately carried forward, through drop curtain or door 6. The normal position of the spray valve actuating mechanism is indicated in Fig. 5. The edge 63 of pan 62 contacts with arcuate section 44 of shoe 43. Should sufficient resistance develop, the pan is prevented from traveling with the conveyor by the shoe 43, until one of pushers 27 comes in contact with the rear face 64 of pan 62, said pusher squaring said pan up with conveyor 5 and transporting said pan through said spray chamber 1, pan 62 forcing shoe 43 to the position indicated in Fig. 1, stop 54 preventing a clockwise rotation of said shoe 43, said shoe being of sufficient length to ride over pan 62 smoothly as said pan travels through said spray chamber 1. As cylindrical member 47 is moved to an angular position about pivot 50, lever 55 pivoted at 56 is depressed at 58 by cam 52 mounted on cylindrical member 47, pin 59 integral with lever 55 forcing bell crank lever 60 in a contra-clockwise direction as viewed in Figs. 1 and 5, depressing plunger 41 and releasing compressed air through nozzle 35, which passing adjacent to the tip of nozzle 36 creates a vacuum, drawing oil from supply tank 37, through valve 39, pipe line 38, and through the restricted aperture in nozzle 36, breaking the oil as it issues from nozzle 36 into a fine spray which is projected onto the pans and contained products, the excess oil, which is not deposited on said pan and products being condensed mainly by suspended plates 30 in the condensing section between the upper and lower strands of the conveyor belt. As pan 62 travels from contact with shoe 43, member 45 in cooperation with pivotal member 47 returns to the position shown in Fig. 5, releasing lever 55, permitting plunger 41 to return to normal outward position as indicated in Fig. 5, through the action of compression spring 65, closing valve 40 against escape of compressed air from nozzle 35, discontinuing the flow of oil from nozzle 36 which flow is dependent on the vacuum created by the air jet from nozzle 35. Pan 62 continues its travel through the drop curtain or door 7 onto a receiving table 66.

The formation of the above mentioned parts is merely conventional, although featuring the essential elements of the invention on a workable basis, and it will be noted that changes in the form, proportion, or construction may readily be resorted to without departing from the spirit or scope of the invention or sacrificing any of the advantages thereof.

I claim:—

1. In combination with a cabinet having disposed therethrough a conveyor adapted to transport containers through said cabinet and driving means for said conveyor, a shoe pivotally mounted on a pivotally hung arm, means for adjusting the vertical position of said shoe relative to said conveyor, a cam adjustably mounted on said arm and cooperating with a lever for operating an actuating valve or release device on a spraying device.

2. A pan spraying machine, in combination with a cabinet and a conveyor extending therethrough, a spray chamber above said conveyor, a condensing chamber beneath said conveyor and having a plurality of spaced depending baffles, a spray gun mounted in said spray chamber and directed downwardly, a depending pivoted arm having a pivoted shoe at the end thereof and a cam adjustably mounted thereon, and means cooperating with said cam for actuating said spray gun.

3. In combination, a cabinet having a vent at the top, a conveyor extending longitudinally through said cabinet and consisting of a pair of continuous strand chains cooperating with sprockets adjacent each end of said cabinet, bridge pieces between said chains in spaced relation, pusher bars parallel to said bridge pieces, longitudinal supports for said chains, a plurality of baffles suspended from said supports and between the upper and lower strands of said chains, transversely of said conveyor, a spray gun mounted above said conveyor, and a swinging arm having a pivotally mounted shoe adapted to cooperate with containers transported by said conveyor, said arm having an adjustable cam for governing an air valve on said spray gun.

In testimony whereof I have affixed my signature.

SVEN P. LARSON.